(12) United States Patent
Daikai

(10) Patent No.: US 7,264,021 B1
(45) Date of Patent: Sep. 4, 2007

(54) HIGH-PRESSURE RESISTANT HOSE

(75) Inventor: Eiichi Daikai, Nagoya (JP)

(73) Assignee: Tokai Rubber Industries, Ltd. (JP)

( * ) Notice: Subject to any disclaimer, the term of this patent is extended or adjusted under 35 U.S.C. 154(b) by 0 days.

(21) Appl. No.: 11/389,954

(22) Filed: Mar. 27, 2006

(30) Foreign Application Priority Data

Mar. 22, 2006  (JP)  .............................. 2006-079822
Mar. 22, 2006  (JP)  .............................. 2006-079823

(51) Int. Cl.
 *F16L 11/00*  (2006.01)
(52) U.S. Cl. ...................................... 138/124; 138/123
(58) Field of Classification Search ........ 138/123–127, 138/109
See application file for complete search history.

(56) References Cited

U.S. PATENT DOCUMENTS

| | | | | |
|---|---|---|---|---|
| 1,361,206 | A * | 12/1920 | Verhunce | 138/126 |
| 2,009,075 | A * | 7/1935 | Thompson | 138/126 |
| 2,518,892 | A * | 8/1950 | Hollingsworth | 138/127 |
| 4,114,656 | A * | 9/1978 | Kish | 138/109 |
| 4,774,043 | A * | 9/1988 | Beckmann | 264/134 |
| 5,044,671 | A * | 9/1991 | Chisnell et al. | 285/55 |
| 5,244,016 | A * | 9/1993 | Kuroda et al. | 138/103 |
| 5,413,146 | A * | 5/1995 | Kuroda et al. | 138/104 |
| 6,250,193 | B1 * | 6/2001 | Head | 87/2 |
| 6,447,017 | B1 * | 9/2002 | Gilbreath et al. | 285/89 |
| 2003/0205898 | A1 * | 11/2003 | Baldwin et al. | 285/256 |
| 2006/0011249 | A1 * | 1/2006 | Arima et al. | 138/109 |
| 2006/0118195 | A1 * | 6/2006 | Arima et al. | 138/126 |

FOREIGN PATENT DOCUMENTS

| | | |
|---|---|---|
| JP | 4-296290 | 10/1992 |
| JP | 5-96644 | 4/1993 |
| JP | 7-68659 | 3/1995 |
| JP | 8-26955 | 3/1996 |
| JP | 3422183 | 10/2001 |

* cited by examiner

*Primary Examiner*—James Hook
(74) *Attorney, Agent, or Firm*—Andrus, Sceales, Starke & Sawall, LLP

(57) ABSTRACT

A hose base body of multilayered construction including an inner surface layer, a reinforcing layer and an outer surface layer has uniform inner diameter, outer diameter and wall-thickness over an entire length thereof. A longitudinal end portion of the hose base body is diametrically expanded, and a main hose body is formed with a small diameter main portion, a large diameter swaged portion and a tapered portion. A braid angle of the reinforcing layer is designed 48° to lower than 54° on the main portion, a braid angle of the reinforcing layer is designed over 57° to 68° on the tightened portion, and a braid angle of the reinforcing layer is designed over about 55° to 61° on the tapered portion.

3 Claims, 9 Drawing Sheets

HIGH-PRESSURE RESISTANT HOSE

TECHNICAL FIELD

1. Field of the Invention

The present invention relates to a high-pressure resistant hose such as an automotive air conditioning hose and a method for producing such high-pressure resistant hose.

2. Description of the Related Art

A hose used for an automotive air conditioning hose has such construction that a reinforcing layer is formed from a reinforcing filament member or reinforcing yarn (for example, spirally wound reinforcing filament member) on an outer side of an inner surface side layer made of rubber, and an outer side of the reinforcing layer is covered with an outer surface side layer made of rubber (for example, refer to Patent Document 1). Such type of a hose is often provided with a resin barrier layer on an inner side of the inner surface side layer in order to prevent global warming by reducing permeation of an internal fluid, i.e. a refrigerant.

Since such air conditioning hose is used for connecting between an engine side and a vehicle body side, the air conditioning hose is preferably provided with vibration absorbing property sufficient to prohibit transmission of vibration, such as engine vibration, compressor vibration or vehicle body vibration during driving to mating components. However, formation of the resin barrier layer improves resistance of the air conditioning hose to refrigerant permeation, but lowers such vibration absorbing property or vibration damping property. So, it is required to form the air conditioning hose long (for example, even when a hose is adapted for connecting distance of about 300 mm, the hose is formed about 400 mm in length) so that formation of the resin barrier layer does not cause lack of vibration absorbing property in the air conditioning hose or does not reduce vibration absorbing property of the air conditioning hose.

However, in many cases, an engine room of a motor vehicle is tightly packed with parts, etc., and cannot afford or secure sufficient piping space. So, it is often disadvantageous to take such measures as formation of the resin barrier layer and increase of a hose length. Then, it is conceived to form the air conditioning hose as short as possible, instead of formation of the resin barrier layer. When the hose is sufficiently short, the refrigerant permeation through the hose or and from the hose can be lowered. And, when the hose is constructed to have a short length but secure sufficient vibration absorbing property, it is possible to provide the air conditioning hose which can be accommodated in a narrow piping space, is low in refrigerant permeation and good in vibration absorbing property.

By the way, in the air conditioning hose, when a refrigerant is introduced in the hose at high pressure, lack of the vibration absorbing property is caused. When the refrigerant is not introduced in the hose, the vibration absorbing property almost does not matter. Namely, when the refrigerant is supplied in the hose at high pressure, the hose and the refrigerant are unified, thereby the hose is rigidified, and this results in lack of the vibration absorbing property. And this rigidification of the hose depends on a cross-sectional area of an inside of the hose (an area of a cross-section or cutting plane of the hose in a radial direction). The larger the cross-sectional area is, the more the hose is rigidified, and, the smaller the cross-sectional area is, the less the hose is rigidified.

Then, it may be conceived to form a small-diameter air conditioning hose in order to secure the vibration absorbing property. However, on an end portion of the air conditioning hose (main hose body), a joint device, for example, including an insert pipe and a socket fitting (tightening fitting), is attached. When the main hose body has a small-diameter over its entire length, the insert pipe of the joint device has to be inserted in an end portion (a tightened or to-be-tightened portion, more specifically, a swaged or to-be-swaged portion) of the main hose body, while diametrically expanding the swaged portion (a portion to be tightened by the socket fitting that is swaged). But, the air conditioning hose is typically has a bursting pressure of 5 MPa or more, insertion resistance becomes too great and it is practically difficult to insert the insert pipe in the end portion of the main hose body.

In order to solve a foregoing problem, it is conceived to adapt means to produce a main hose body including a small-diameter main portion and a large diameter swaged portion. The insert pipe is inserted in the swaged portion that has a diameter larger than that of the main portion, the socket fitting fitted on an outer periphery of the swaged portion is swaged to tighten (swage) the swaged portion to the insert pipe. In this regard, for example, Patent Documents 2 and 3 disclose a technique that a connecting portion of a hose with a pipe is formed with large diameter, in advance.

[Patent Document 1] JP-A, 7-68659
[Patent Document 2] JP-B, 3244183
[Patent Document 3] JP-B, 8-26955

Meanwhile, the air conditioning hose to be arranged in the narrow piping space should exhibit a small length change rate (in absolute value) when a pressure-fluid, i.e., a refrigerant is supplied therein. If the length change rate under exerted pressure is large, a hose changes largely in length when pressurizing refrigerant is supplied, the hose contacts or abuts peripheral parts, etc. or is pressed firmly against the peripheral parts, etc. As a result, there is fear that the hose is damaged or the hose gets out of the piping space. And, the length change rate of the hose under exerted pressure depends on braid angle or winding angle of a reinforcing yarn of the reinforcing layer. That is, in the hose, the braid or winding angle tends to return to about 55° (54.7°, neutral angle) when an internal pressure is applied. So, when the braid or winding angle is lower than about 55°, the hose tends to change so as to expand in a radial direction and so as to contract in a longitudinal direction under exerted pressure. Further, when the braid or winding angle is greater than about 55°, the hose tends to change so as to increase in length in the longitudinal direction and so as to contract in the radial direction under exerted pressure. When the braid or winding angle is about 55° (54.7°, neutral angle), the hose is prevented from change in the longitudinal direction and the radial direction even under exerted pressure. So, in case that the tightened portion or swaged portion of the main hose body is diametrically enlarged, it is necessary to prevent increase of the length change rate (in absolute value) of the hose or the main hose body under exerted pressure by adjusting the braid or winding angle of the reinforcing filament member on the main portion, the tapered portion and the swaged portion, respectively, and a relation between lengths of these portions.

The main hose body including a small diameter main portion and a large diameter swaged portion is obtained in such manner that, a hose base body is formed so as to have a uniform diameter equal to that of the main portion, over its entire length, longitudinal opposite end portions of the hose base body are diametrically expanded by press inserting mandrels into the longitudinal opposite end portions to form into large-diameter swaged portions. In order to prevent that the mandrel cannot be press inserted in longitudinal opposite end portions of the hose base body due to buckling of the hose base body, it is necessary to retain a longitudinal middle portion of the hose base body by or in a retaining mold. The retaining mold comprises a plurality of retaining mold segments, the retaining mold segments are mated together to define a receiving portion. The hose base body is firmly sandwiched and retained by the receiving portion on the longitudinal middle portion.

It is effective that the receiving portion defined by mated mold segments has a cross-sectional shape so as to compress the hose base body. When the receiving portion compresses or is compressing the hose base body, the hose base body is prevented or restrained from expanding in the radial direction within the receiving portion. So, buckling is not caused when the mandrel is press inserted in the hose base body.

However, when the receiving portion is defined so as to compress the hose base body, there is fear that material of an outer surface side layer is pushed out from between the retaining mold segments at time of mating contact of the retaining mold segments, and flash is formed on the main hose body produced. This makes post treatment after the main hose body is produced troublesome.

In order to solve a foregoing problem, it is an object of the present invention to provide a novel high-pressure resistant hose having a good vibration absorbing property, for example, that exhibits a small length change rate or amount under exerted pressure and/or can be arranged stably in the narrow piping space.

And, it is another object of the present invention to provide a method for producing a high-pressure resistant hose wherein buckling of the hose base body can be prevented when diametrically expanding the longitudinal end portions of the hose base body and/or bothersome posttreatment of the main hose body is not required.

SUMMARY OF THE INVENTION

According to the present invention, there is provided a novel high-pressure resistant hose. The high-pressure resistant hose has bursting pressure equal to or greater than 5 MPa. The high-pressure resistant hose comprises a main hose body of multi-layered construction that includes an inner surface side layer, a reinforcing layer comprising a braided or spirally wound reinforcing filament member on outer side of the inner surface side layer and an outer surface side layer as cover layer on an outer side of the reinforcing layer, and a joint device. The main hose body has a main portion, and a tightened portion or to-be-tightened portion with diameter larger than that of the main portion on a longitudinal end portion (for example, each of opposite longitudinal end portions) of the main hose body. The joint device is fixedly secured to the tightened portion, and has an insert pipe that is inserted in the tightened portion with diameter larger than that of the main portion, and a tightening fitting that is fitted on an outer periphery of the tightened portion for tightening the tightened portion to the insert pipe. The main hose body further has a tapered portion between the tightened portion and the main portion. The braided or spirally wound reinforcing filament member of the reinforcing layer has an angle (braid or winding angle) of 48° to lower than 54° on the main portion, an angle (braid or winding angle) of over 57° to 68° on the tightened portion and an angle (braid or winding angle) of over about 55° (neutral angle) to 61° on the tapered portion. The braid or winding angle of the reinforcing filament member on the tapered portion is lower than the angle of the braided or spirally wound reinforcing filament member on tightened portion, and a ratio of a length (an axial length) of the main portion with respect to a free length (a free axial length) of the main hose body is 65% to 93% under pressureless condition. Here, the main hose body is molded or formed with the tightened portion being diametrically expanded. So, the insert pipe of the joint device is to be inserted in the tightened portion that is diametrically expanded. Therefore, for example, in the high-pressure resistant hose with the bursting pressure equal to or greater than 5 MPa where the braided or wound reinforcing filament member of the reinforcing layer has a density (braid or winding density) equal to or greater than 50%, even when a main portion comprising a major part or long region or the like of the main hose body has a small diameter to increase vibration absorbing property, it is not difficult to attach the joint device to the main hose body (the tightened portion), more specifically to insert or press insert the insert pipe in the main hose body (the tightened portion). An outer diameter of the insert pipe may be set equal to or generally equal to an inner diameter (diametrically expanded inner diameter) of the tightened portion prior to insertion of the insert pipe. The reinforcing layer may comprise a braided reinforcing filament member, or may also comprise a spirally wound reinforcing filament member. A braid or winding density means a ratio (%) of an area of the reinforcing filament member with respect to an overall area of the reinforcing layer. More specifically, the braid or winding density can be given by a formula (yarn width×No. of yarns/(2×π×outer diameter of the inner surface side layer or of a layer just under the reinforcing layer×cos. braid or winding angle))×100. On the tapered portion, in fact, a braid or winding angle is changed from the braid or winding angle of the main portion to the braid or winding angle of the tightened portion, from an end of the main portion toward an end of the tightened portion. However, the braid or winding angle of the tapered portion with regard to the present invention means a braid or winding angle at an axial center of the tapered portion.

The main hose body is constructed, for example, in a following manner. First, prepared or produced is a hose base body, which includes a reinforcing layer, and has a uniform diameter over its entire length. The reinforcing layer comprises the braided or wound reinforcing filament member or yarn and has a uniform braid or winding angle over its entire length. And a longitudinal end portion (for example, longitudinal opposite end portions) of the hose base body is diametrically expanded. The braid or winding angle means an angle of the reinforcing-filament member or yarn with respect to an axis of a hose. According to the present invention, braided or spirally wound filament member or yarn of the reinforcing layer has an angle (braid angle or winding angle) of 48° to lower than 54° on the main portion (namely, a hose base body). So, an end portion (for example, longitudinal opposite end portions) of the hose base body can be easily diametrically expanded, after the hose base body is produced. And, when an internal pressure is exerted in a main hose body, the main portion changes so as to reduce in length. Here, when the braided or spirally wound reinforcing filament member of the reinforcing layer has an angle lower than 48° on the main portion, the main portion contracts largely in length under pressure exerted to the main hose body. So, in order to restrain length change ratio of an entire free region of the main hose body under exerted pressure small, it is necessary to form long tapered portion and tightened portion where the braided or spirally wound reinforcing filament member of the reinforcing layer has an angle over neutral angle. Then, it becomes bothersome to handle a hose or difficult to arrange the hose in a narrow piping space. And, when the braided or spirally wound reinforcing filament member of the reinforcing layer has an angle equal to or greater than 54° on the main portion, resistance to diametrical expansion is increased in case of diametrically expanding the end portion of the hose base body, a length change ratio under exerted pressure becomes large, and it becomes bothersome to handle the hose.

An angle of the braided or spirally wound reinforcing filament member of the reinforcing layer is set over 57° to 68° on the tightened portion, and over about 55° (more specifically, over 54.7° or neutral angle) to 61° on the tapered portion. Thus, when the internal pressure is exerted in the main hose body, the main portion changes so as to reduce in length, while the tightened portion and the tapered portion change so as to increase in length. Thus, the length change rate (length change rate under exerted pressure, absolute value) of whole of the main hose body (entire free region of the main hose body) can be restrained small. When the angle of the braided or spirally wound reinforcing filament member of the reinforcing layer is equal to or lower than 57° on the tightened portion, the tightened portion does not change so as to increase in length to an extent necessary to counter change of the main portion under exerted pressure. So, there is fear that the length change rate (in absolute value) of the entire free region of the main hose body becomes large. And, it is difficult to diametrically expand the tightened portion (the longitudinal end portion or longitudinal opposite end portions of the hose base body) until the angle of the braided or spirally wound reinforcing filament member exceeds 68°. Similarly, when the angle of the braided or spirally wound reinforcing filament member of the reinforcing layer is equal to or lower than about 55° (more specifically, 54.7° or neutral angle) on the tapered portion, the tapered portion does not change so as to increase in length under exerted pressure. So, there is fear that the length change rate (in absolute value) of the entire free region of the main hose body becomes large. And, when the angle of the braided or spirally wound reinforcing filament member of the reinforcing layer is over 61° on the tapered portion, the angle of the braided or spirally wound reinforcing filament member becomes too great on the main portion or the tightened portion. In the hose including the small diameter main portion (an inner diameter of the main portion is about 9 mm, or 9 mm to 11 mm) to be subject to high internal pressure, it is effective that the braided or spirally wound reinforcing filament member of the reinforcing layer has an angle of 66° to 68° on the tightened portion in order to restrain the length change rate (in absolute value) of the entire free region small. When the braided or spirally wound reinforcing filament member of the reinforcing layer has an angle equal to or lower than 60° on the tapered portion, it becomes possible to restrain the length change ratio (in absolute value) of the entire free region smaller.

In particular, a sealing performance between the main hose body and the joint device (the insert pipe) is improved by designing the tightening portion to be diametrically contracted under exerted pressure.

A ratio of a length of the main portion with respect to the free length (unrestrained length) of the main hose body, for example, a length of a region (portion) of the main hose body between parts tightened by the joint devices (for example, swaged parts), or a length of a region (portion) of the main hose body between innermost positions of the parts tightened by the joint device (for example, innermost positions of swaged parts) is required to be 65% to 93% under pressureless condition. When the ratio of the length of main portion with respect to the free length of the main hose body is less than 65%, length change of the tightened portion and the tapered portion too much affects the length change ratio of the whole of the main hose body (the entire free region of the main hose body), there is fear that a length change ratio (in absolute value) of the whole of the main hose body becomes large. When the ratio of the length of main portion with respect to the free length of the main hose body is greater than 93%, length change of the tightened portion and the tapered portion too little affects the length change ratio of the whole of the main hose body (the entire free region of the main hose body), or length change of the main portion too much affects the length change ratio of the whole of the main hose body, there is also fear that the length change ratio (in absolute value) of the whole of the main hose body becomes large. And, Meanwhile, when the free length of the main hose body is over 300 mm under pressureless condition, it is difficult to arrange the high-pressure resistant hose in the narrow piping space and a permeation amount of the internal fluid is increased.

The free region of the main hose body preferably has a length change ratio under exerted pressure in a range of −5% to 10%. The length change ratio is given by a formula ((free length of the main hose body under exerted pressure−free length of the main hose body prior to exertion of pressure)/ free length of the main hose body prior to exertion of pressure)×100. When the length change ratio is under −5%, the main hose body contracts too much in a longitudinal direction under exerted pressure and the high-pressure resistant hose is under tension state. So, there is fear that a large stress is generated in the tightened portion, and thereby durability of a hose is lowered. And when the length change ratio is over 10%, the main hose body too much expands in the longitudinal direction under exerted pressure, so there is fear that the high-pressure resistant hose contacts or abuts with the peripheral parts, etc. and gets out of the piping space.

According to the present invention, there is provided a new method for producing a high-pressure resistant hose. The high-pressure resistant hose, which is produced, comprises a main hose body of multi-layered construction that includes an inner surface side layer, a reinforcing layer comprising a braided or spirally wound reinforcing filament member or reinforcing yarn on an outer side of the inner surface side layer and an outer surface side layer as cover layer on an outer side of the reinforcing layer, and a joint device. The main hose body has a main portion, and a tightened portion or to-be-tightened portion with diameter larger than that of the main portion on a longitudinal end portion (for example, each of longitudinal opposite end portions) of the main hose body. The joint device is fixedly secured to the tightened portion. The joint device has an insert pipe that is inserted in the tightened portion with diameter larger than that of the main portion, and a tightening fitting that is fitted on an outer periphery of the tightened portion for tightening the tightened portion to the insert pipe. The method for producing such a high-pressure resistant hose in accordance with the present invention, comprises a step of preparing a hose base body of the multilayered construction that includes the inner surface side layer, the reinforcing layer and the outer surface side layer, and of uniform inner diameter, outer diameter and wall-thickness over an entire length thereof, a step of retaining the hose base body by a retaining mold (retaining member) such that a longitudinal end portion thereof (for example, each of the longitudinal opposite end portions) protrudes outwardly from the retaining mold, a step of push inserting a mandrel (a diametrically expanding member or rod) into the longitudinal end portion (for example, each of the longitudinal opposite end portions) of the hose base body that is retained by the retaining mold and diametrically expanding the longitudinal end portion (for example, each of the longitudinal opposite end portions) to form the tightened portion, a step of vulcanizing the hose base body with the tightened portion formed to obtain the main hose body, and a step of securely fixing the joint device to the tightened portion of the main hose body. The retaining mold comprises a plurality of retaining mold segments that are formed with element recesses, respectively. The retaining mold segments are configured so as to be mated together to provide the retaining mold with a receiving portion (cavity) that receives and retains the hose base body. The receiving portion is defined by the combined element recesses. The element recess may be provided in the retaining mold segment over an entire length thereof, and the receiving portion may be provided in the retaining mold, extending therethrough in a longitudinal direction. The receiving portion receives the hose base body compressively, and the receiving portion includes an escape portion that allows a deformed portion of the hose base body compressed to escape therein. The high-pressure resistant hose that is produced has a bursting pressure, for example, equal to or greater than 5 MPa. In the high-pressure resistant hose, the reinforcing layer may comprise a braided reinforcing filament member, and also may comprise a spirally wound reinforcing filament member. The braided or spirally wound reinforcing filament member of the reinforcing layer may have a density equal to or greater than 50%. And, the main hose body may be formed with a tapered portion between the tightened portion and the main portion. Further, the high-pressure resistant hose may be constructed such that the braided or spirally wound filament member or yarn of the reinforcing layer has an angle (braid or winding angle) of 48° to lower than 54° on the main portion, an angle (braid or winding angle) of over 57° to 68° (for example, an angle of 66° to 68°) on the tightened portion, and an angle (braid or winding angle) of over about 55° (more specifically, over 54.7° or neutral angle) to 61° (for example, 60° or lower) on the tapered portion. And, the high-pressure resistant hose may be constructed such that a ratio of a length of the main portion with respect to a free length of the main hose body is 65% to 93% under pressureless condition, and a free length of the main hose body is equal to or less than 300 mm under the pressureless condition. The free region of the main hose body may have a length change ratio under exerted pressure in a range −5% to 10%.

When the restraining mold segments are mated together, the element recesses are combined with the hose base body therebetween and defines a receiving portion for receiving the hose base body therein. The receiving portion is formed so as to compress the hose base body. So, when the element recesses are combined, the hose base body is compressed, pushed down, tightened or sandwiched tightly. Thus, the hose base body is received in restrained relation within the receiving portion defined by the retaining mold segments. When the element recesses are mated together to define the receiving portion, since the hose base body is compressed, the hose base body is deformed and a material of the hose base body is moved. However, a deformed portion of the hose base body escapes in an escape portion that is formed in the receiving portion, and thereby the material of the hose base body does not go out of between the retaining mold segments. It is effective to form the escape portion or escape portions on mating contact positions (positions of mold mating surfaces) or straddling over two restraining mold segments.

In order to simplify construction, the retaining mold may comprise a pair of mold halves or mold segments (retaining mold segments). Here, the element recesses may be formed into semicircular cross-section, respectively, so as to form the receiving portion that has a circular cross-section with a diameter smaller than an outer diameter of the hose base body. In this configuration, the hose base body can be firmly retained in the receiving portion. And, each of the element recesses may have shallow element slots in opposite side edge portions thereof for forming the escape portions on opposite sides of the receiving portion. In this configuration, a deformed portion of the hose body can be effectively let out into the escape portion that is formed at the mating contact position without allowing the material of the hose base body to get out of the receiving portion. The element slot may be provided in the retaining mold segment over an entire length thereof, and the escape portion may be provided in the retaining mold, extending therethrough in a longitudinal direction or generally over an entire length thereof.

The element recesses may be formed into semioval or semiellipse cross-section, respectively, so as to define the receiving portion that has an oval or ellipse cross-section with a minor axis (shortest diameter) smaller than an outer diameter of the hose base body, in a mating contact direction of the retaining mold segments and a major axis (longest diameter) longer than the outer diameter of the hose base body, perpendicular to the minor axis. In this configuration, the hose base body can be also firmly retained in the receiving portion. Here, the receiving portion has the escape portions on or around opposite end positions of the major axis. The escape portions are located in mating contact positions.

An insertion aid may be applied between the longitudinal end portion of the hose base body and the mandrel. Then, an insertion resistance acting on the mandrel can be reduced, and the mandrel can be easily pushed in or push inserted in the longitudinal end portion.

As described, according to the present invention, it is possible to provide a high-pressure resistant hose that has an excellent vibration absorbing property, for example, can restrain permeation amount of an internal fluid small, and can be stably arranged in a narrow piping space.

And, further, according to the present invention, can be easily produced the high-pressure resistant hose including a large diameter tightened portion on which a joint device is securely fixed.

Now, the preferred embodiments of the present invention will be described in detail with reference to the drawings.

DETAILED DESCRIPTIONS OF PREFERRED EMBODIMENTS

Figure 1:
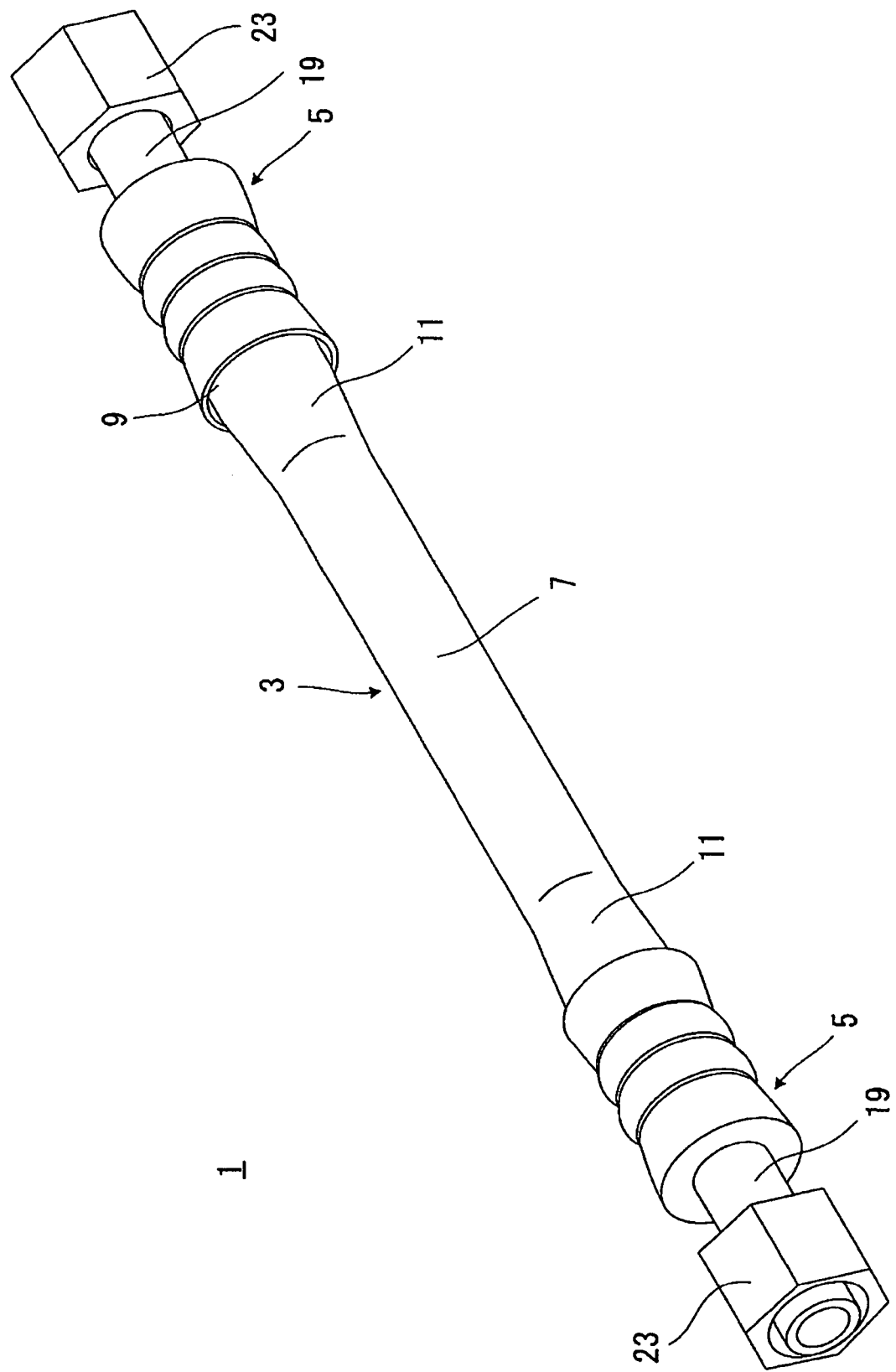
FIG. 1 is a perspective view of a high-pressure resistant hose according to the present invention.

A high-pressure resistant hose 1 shown in FIG. 1 is used, for example, as an air conditioner hose of a motor vehicle. The high-pressure resistant hose 1 includes a main hose body 3 where metal joint device (coupling or fitting) 5 are securely fitted to longitudinal opposite ends thereof, respectively. The main hose body 3 has a main portion 7 on a longitudinal middle portion thereof, swaged portions or to-be-swaged portions (tightened portions) 9, 9 on longitudinal opposite end portions thereof, and tapered portions 11, 11 each between the main portion 7 and the swaged portion 9. The main portion 7 is formed in a long-slim tubular shape having uniform inner and outer diameters over its entire length thereof. Each of the swaged portion 9 has a tubular shape with inner and outer diameters larger than those of the main portion 7. Each of the tapered portions 11 has a tapered shape gradually reducing a diameter from the swaged portion 9 to the main portion 7.

Figure 2:
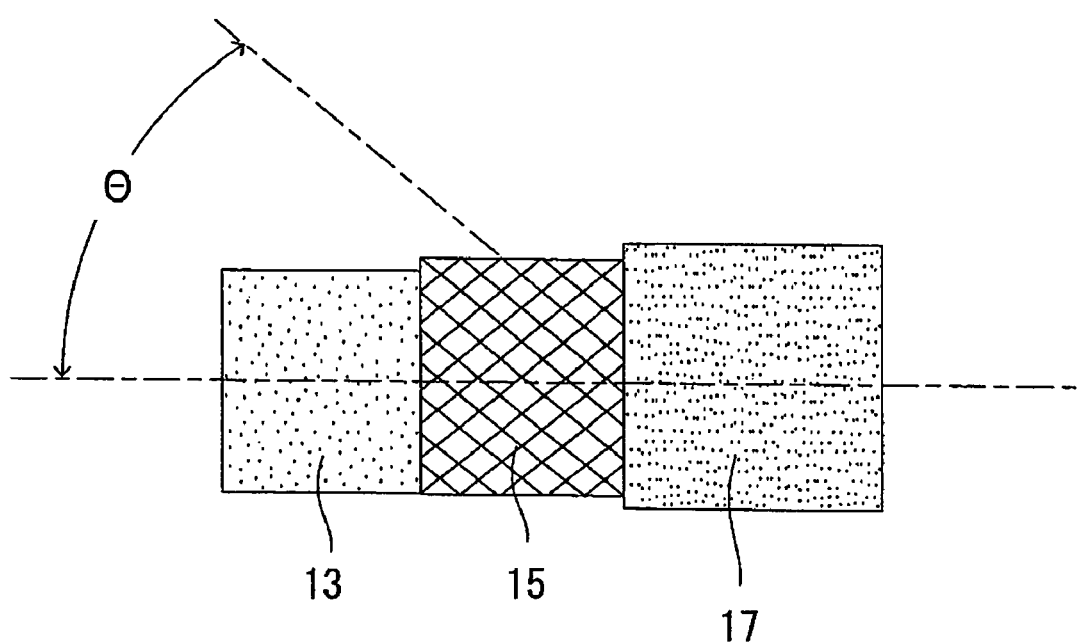
FIG. 2 is a view showing a multilayered construction of a main hose body of a main hose body of the high-pressure resistant hose.

As shown in FIG. 2, the main hose body 3 has a multilayered construction over its entire length including an inner surface side layer (inner surface layer) 13 made of rubber, a reinforcing layer 15 formed by braiding a reinforcing yarn (reinforcing filament member) on an outer periphery of the inner surface side layer 13, and an outer surface side layer (outer surface layer) 17 made of rubber and formed on an outer periphery of the reinforcing layer 15. The reinforcing layer 15 is formed directly on the outer periphery of the inner surface side layer 13, and the outer surface side layer 17 is formed directly on the outer periphery of the reinforcing layer 15. Meanwhile, reference character θ indicates a braid or winding angle of a reinforcing filament member with respect to an axis of a hose.

Figure 3:
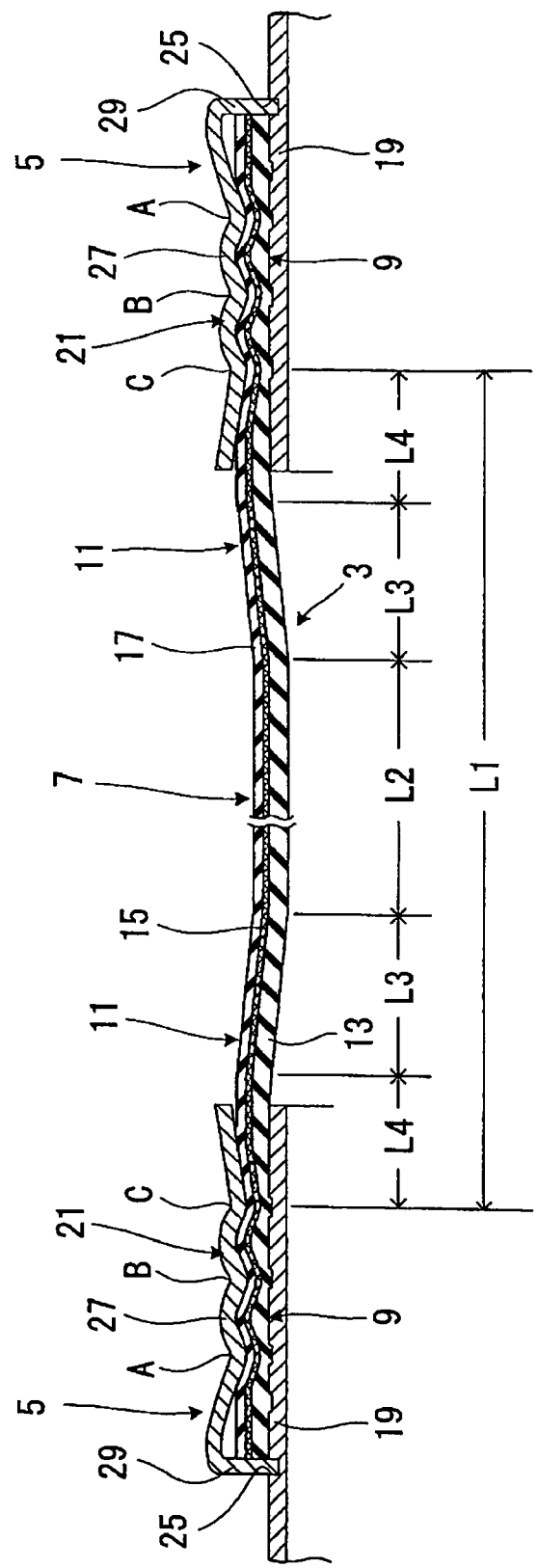
FIG. 3 is a sectional view of the high-pressure resistant hose.

The joint device 5 has a metal insert pipe 19 that is inserted in the swaged portion 9 of the main hose body 3, and a metal socket fitting (tightening fitting) 21 that is fitted on an outer periphery of the swaged portion 9. On an outer periphery of an axially outer end portion of the insert pipe 19, a metal nut 23 for connection is fitted rotatably in locked relation. The metal nut 23 includes internally threaded inner peripheral surface. As well shown in FIG. 3, the insert pipe 19 includes an annular groove 25 on an outer peripheral surface thereof for securely fixing the socket fitting 21 to the insert pipe 19. The insert pipe 19 is inserted in the swaged portion 9 so as to locate the annular fixing groove 25 outside an axial end surface of the main hose body 3, more specifically to locate the annular groove 25 outside the axial end surface of the main hose body 3 and adjacent to the axial end surface thereof. And, the socket fitting 21 has a sleeve 27 and an inwardly directed flange 29 that is formed integrally on an axially outer end portion of the sleeve 27. The sleeve 27 of the socket fitting 21 is fitted on the outer periphery of the swaged portion 9 so as to locate the inwardly directed flange 29 outside the axial end surface of the main hose body 3, corresponding to the annular groove 25 of the insert pipe 19. By swaging the sleeve 27, the sleeve 27 tightens or swages the swaged portion 9 to the insert pipe 19, the inwardly directed flange 29 enters in the annular groove 25, and the socket fitting 21 is fixed to the insert pipe 19 in unitary relation. Meanwhile, the sleeve 27 is swaged at three positions (A, B, C) along its length, respectively, and the swaged portion 9 is tightened at these three positions (A, B, C), respectively. A portion of the main hose body 3 between the innermost swaged positions C, C in swaged region from the position A to the position C defines a free region that are elastically deformable. An axial length of the free region, i.e., a free length L1 is set equal to or less than 300 mm under pressureless condition. A ratio of an axial length L2 of the main portion 7 with respect to the free length L1 of the free region is 65% to 93% under pressureless condition. And, an axial length L1 of the free region is (an axial length L2 of the main portion 7+twice an axial length L3 of the tapered portion 11+twice an axial length L4 of an inner portion of the swaged portion 9 with respect to a swaged position C or a length or axial length L4 of the swaged portion 9 in the free region).

For the inner surface side layer 13 and the outer surface side layer 17, may be used butyl rubber (IIR), halogenated butyl rubber (halogenated IIR), i.e., chlorobutyl rubber (Cl-IIR) and bromobutyl rubber (Br-IIR), acrylonitrile-butadiene-rubber (NBR), chloroplene rubber (CR), ethylene-propylene-diene-rubber (EPDM), ethylene-propylene rubber (EPM), fluoro rubber (FKM), epichlorohydrin and ethylene oxide copolymer (ECO), silicon rubber, urethane rubber, acrylic rubber or the like, as single or blend material. Although the outer surface side layer 17 is made of rubber here, may be made from a shrink tube of acrylic type, stylene type, olefin type, diolefin type, polyvinyl chloride type, urethane type, ester type, amide type, fluorine type or the like, and thermoplastic elastomer (TPE). And, for reinforcing filament member or reinforcing yarn of the reinforcing layer 15, may be used polyethylene terephthalate (PET), polyethylene naphthalate (PEN), aramid, polyamide (PA), vinylon, rayon, or the like. Further, a metal wire member may be also used as reinforcing filament member.

Figure 4:
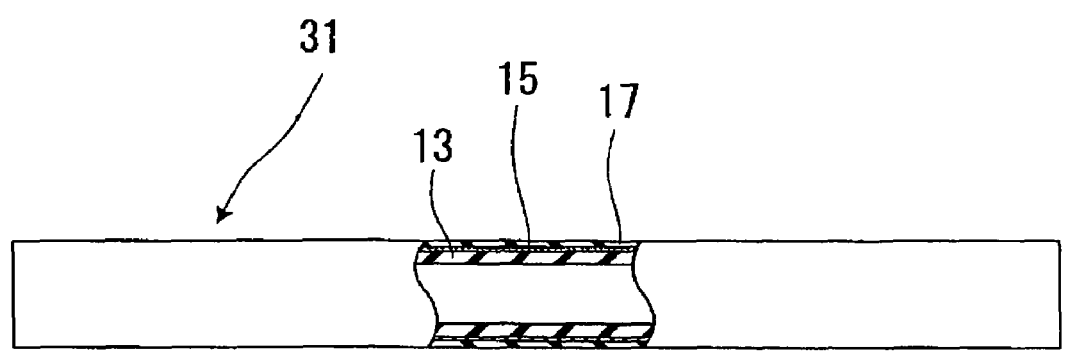
FIG. 4 is a view showing a hose base body.

The high-pressure resistant hose 1 is manufactured in a following manner. First, the inner surface side layer 13, the reinforcing layer 15 and the outer surface side layer (cover layer) 17 are laminated each other to form a multilayered lengthy body that has uniform inner and outer diameters and wall-thickness over its entire length, the lengthy body is cut into a pre-set length, and a hose base body 31 is obtained (refer to FIG. 4). The reinforcing layer 15 is formed by braiding a reinforcing yarn at a braid angle of 48° to lower than 54°. In order not to create roughness on an inner surface of the inner surface side layer 13 by the reinforcing layer 15, a preferable wall thickness of the inner surface side layer 13 is equal to or larger than 1.0 mm. And, in order not to create roughness on an outer surface of the outer surface side layer 17 by the reinforcing layer 15, an effective wall thickness of the outer surface side layer 17 is equal to or greater than 0.9 mm.

Figure 5:
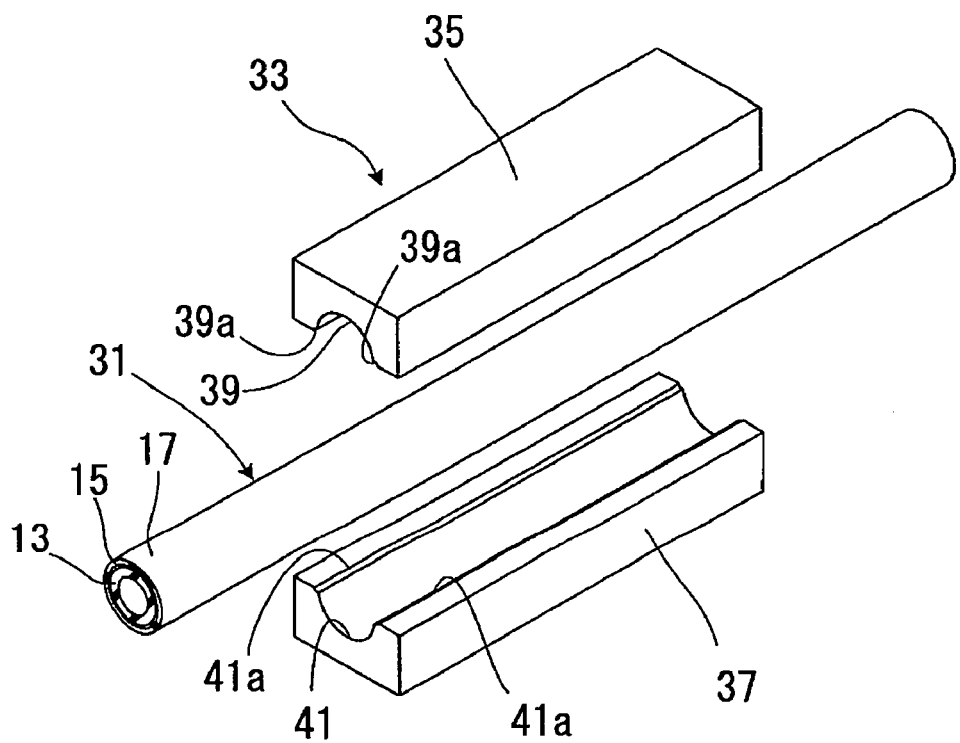
FIG. 5 is a view showing a construction of a retaining mold.
Figure 6:
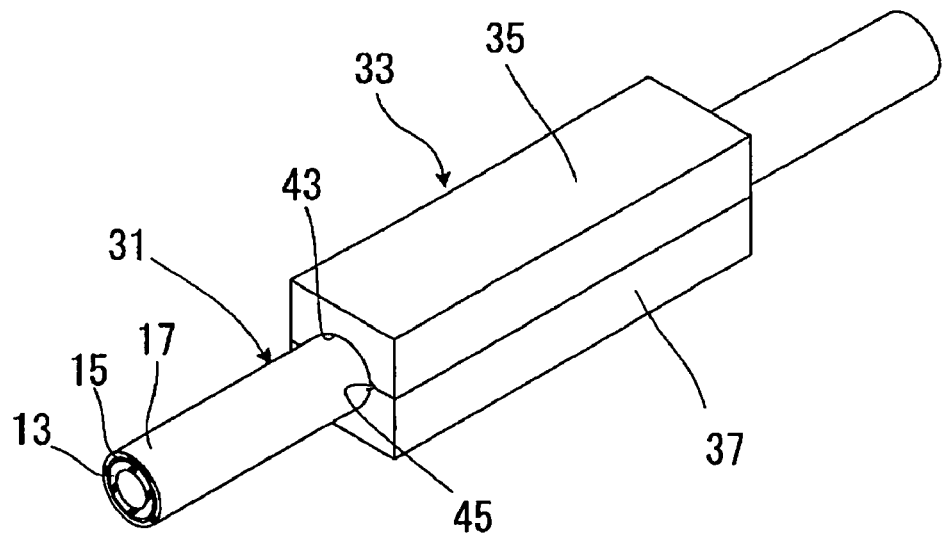
FIG. 6 is a view showing a state that the hose base body is retained by the retaining mold.
Figure 7:
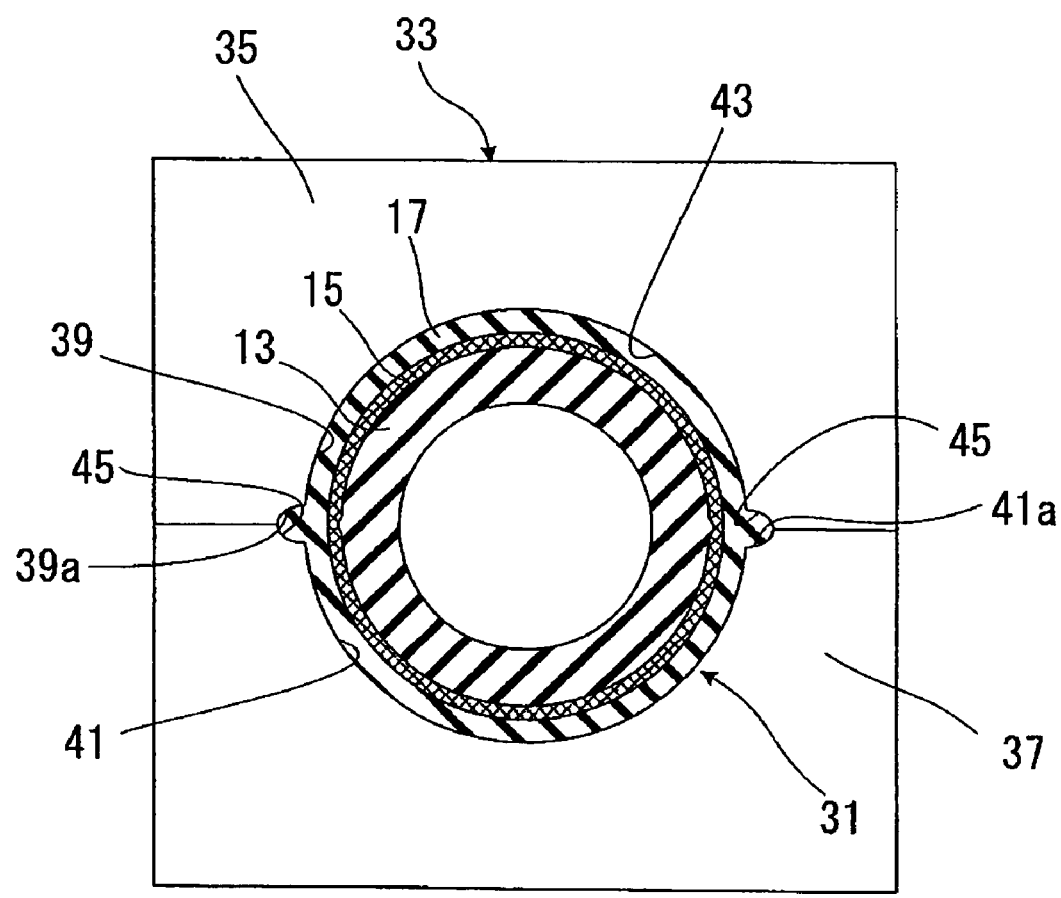
FIG. 7 is a view showing a construction of a receiving portion when the hose base body is retained by the retaining mold.

Next, the hose base body 31 is retained by a retaining mold (retaining member) 33 such that longitudinal opposite ends of the hose base body 31 protrude outwardly, respectively. The retaining mold 33 comprises half-shaped upper mold 35 and lower mold 37. The upper and lower molds 35, 37 are formed with element recesses 39, 41 of semicircular cross-section in mating surfaces thereof, respectively (refer to FIG. 5). The element recesses 39, 41 define a long-slim receiving portion (cavity) 43 of circular cross-section (more specifically, having a length equal to or generally equal to the length L2 of the main portion 7) when the upper and lower molds 35, 37 are mated each other. A diameter of the receiving portion 43 is slightly smaller than an outer diameter of the hose base body 31. Namely, the diameter or radius of each of the element recesses 39, 41 is slightly smaller than the outer diameter or an outer radius of the hose base body 31. Also, the element recess 39 is formed with shallow escape slot 39a in each of opposite side edge portions thereof, and the element recess 41 is formed with shallow escape slot 41a in each of opposite side edge portions thereof. By mating the upper mold 35 and the lower mold 37 together, the escape slot 39a and the escape slot 41a are matched together to form escape recessed portion 45 protruding outwardly on each of opposite side portions of the receiving portion 43 (refer to FIG. 7). Each of the escape slots 39a, 41a may be formed into a quarter circular cross-section, a quarter oval cross-section or a quarter ellipse cross-section, and the escape recessed portion 45 may be formed into a semicircular cross-section (for example, cross-section of semicircle with radius of about 1 mm), a semioval cross-section or a semiellipse cross-section. So, when the upper mold 35 and the lower mold 37 are mated together so as to sandwich the hose base body 31 by the element recesses 39, 41, and thereby the hose base body 31 is retained by the retaining mold 33, the hose base body 31 is tightly and compressively received in the receiving portion 43 that has a diameter smaller than the outer diameter of the hose base body 31, with longitudinal opposite ends thereof protruding outside the retaining mold 33 (refer to FIGS. 6 and 7). The hose base body 31 is retained in the retaining mold 33 not to be allowed to be displaced in a longitudinal direction and not to be allowed to be expansively deformed in a diametrical direction. And, deformation of the hose base body 31 when tightly and compressively sandwiched by the element recesses 39, 41 is absorbed by the escape recessed portions 45. So, it can be effectively prevented that the hose base body 31 has a molding flash. Meanwhile, the retaining mold 33 is retained, for example, by being attached to a retaining equipment.

Figure 8:
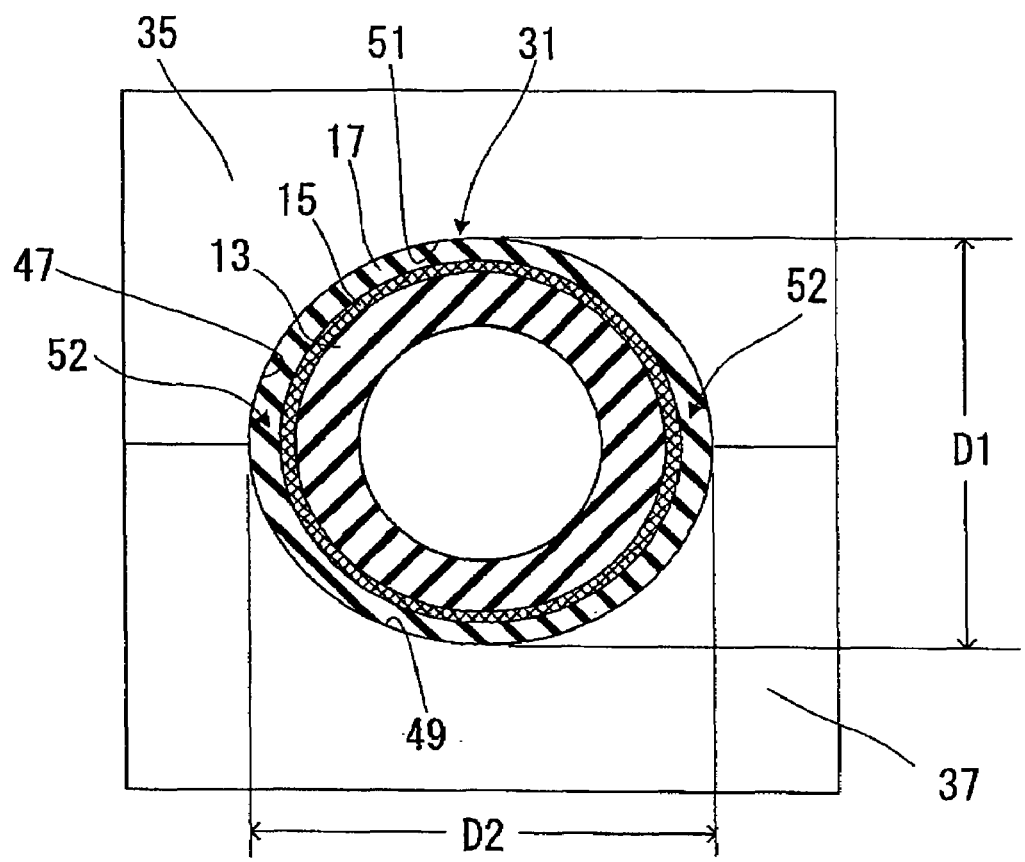
FIG. 8 is a view showing a construction of another receiving portion.

An element recess may be formed also into a semioval cross-section or semiellipse cross-section. Such element recesses 47, 49 may be configured so as to define a receiving portion (cavity) 51 of an oval or ellipse cross-section including a minor axis or shortest diameter with length (D1) shorter than the outer diameter of the hose base body 31, and a major axis or longest diameter with length (D2) longer than the outer diameter of the hose base body 31 when matched together. In this configuration, the hose base body 31 is sandwiched tightly and compressively by the element recesses 47, 49, and deformation of the hose base body 31 is absorbed in escape portions 52 at opposite end positions of the major axis or longest diameter (refer to FIG. 8). Thereby it can be also effectively prevented that the hose base body 31 has a molding flash.

Figure 9:
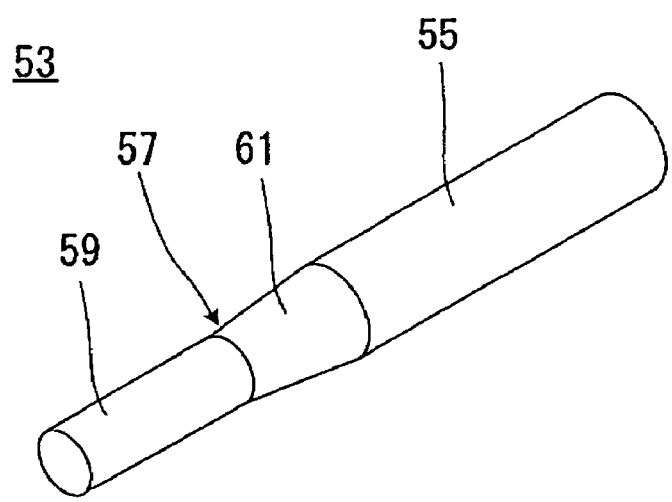
FIG. 9 is a view showing a mandrel.

After the hose base body 31 is sandwiched and retained by the retaining mold 33, a mandrel (diametrically expanding rod) 53 is inserted in each longitudinal end of the hose base body 31 protruding from the retaining mold 33 to form swaged portion 9 of the main hose body 3. Here, prior to insertion of the mandrel 53, it is advantageous to semi-vulcanize the hose base body 31 in order that the reinforcing layer 15 is hard to bite in the inner surface side layer 13. As shown in FIG. 9, the mandrel 53 integrally has a large diameter portion 55 having an outer diameter equal to or generally equal to an inner diameter of a to-be-formed swaged portion 9, and a leading end guide portion 57 provided on the large diameter portion 55. The leading end guide portion 57 includes a leading end portion 59 having an outer diameter equal to or generally equal to an inner diameter of the hose base body 31, and a diametrically expanding portion 61 between the leading end portion 59 and the large diameter portion 55 that is tapered and diametrically contracts toward the leading end portion 59. Here, a suitable expanding angle (a slanting angle of an outer surface with respect to an axial direction) of the diametrically expanding portion 61 for forming the tapered portion 11 of the main hose body 3 is 5° to 25°. When the expanding angle is lower than 5°, the tapered portion 11 of the main hose body 3 has a too long axial length. When the expanding angle is greater than 25°, insertability of the mandrel 53 (namely, workability of inserting the mandrel 53 in the hose base body 31) is impaired.

For facilitating smooth insertion of the mandrel 53, the mandrel 53 may be formed with a pressurizing hole therethrough that is open at a leading end of the leading end portion 59. The mandrel 53 can be inserted in the hose base body 31 while or after a pressurizing air is supplied in the hose base body 31 via the pressurizing hole. Or in order to reduce sliding resistance between the mandrel 53 and an inner surface of the hose base body 31 for facilitating sliding of the mandrel 53 in the hose base body 31, an insertion aid may be applied between the mandrel 53 and the hose base body 31. For the insertion aid, water, refrigerant oil, silicon or the like may be used.

Figure 10:
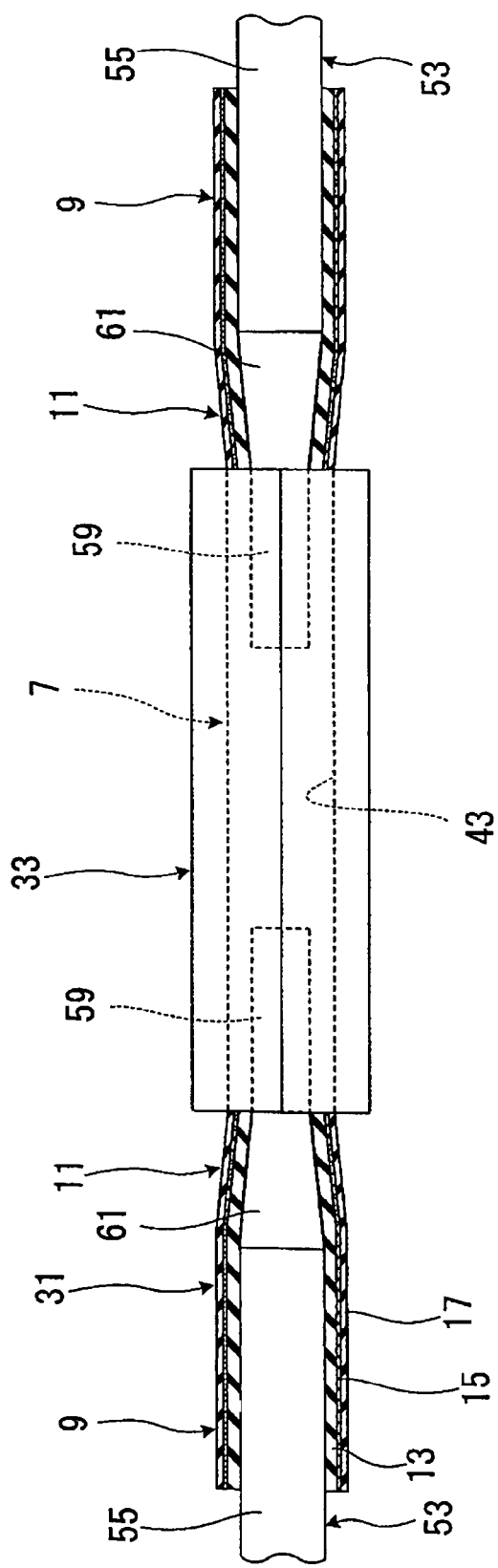
FIG. 10 is a view showing a state that the mandrel is inserted in the hose base body.

By insertion of the mandrel 53 in the hose base body 31, a longitudinal end portion of the hose base body 31 is diametrically expanded, and the swaged portion 9 of large diameter and the tapered portion 11 are formed, as shown in FIG. 10. Initially, a braid angle of the reinforcing yarn of the reinforcing layer 15 is in a range of 48° to lower than 54° in the swaged portion 9 and the tapered portion 11. However, due to diametrical expansion, the braid angle of the reinforcing yarn of the reinforcing layer 15 becomes in a range of over 57° to 68° on the swaged portion 9, and in a range of over about 55° to 61° on the tapered portion 11 (more specifically, on an axial center of the tapered portion 11). Meanwhile, in the swaged portion 9, the braid angle of the reinforcing yarn of the reinforcing layer 15 may be set in a range of 60° to 68°. And, in the tapered portion 11, the braid angle of the reinforcing yarn of the reinforcing layer 15 (the braid angle on an axial center of the tapered portion 11) may be set in a range of over about 55° to 60°.

Figure 11:
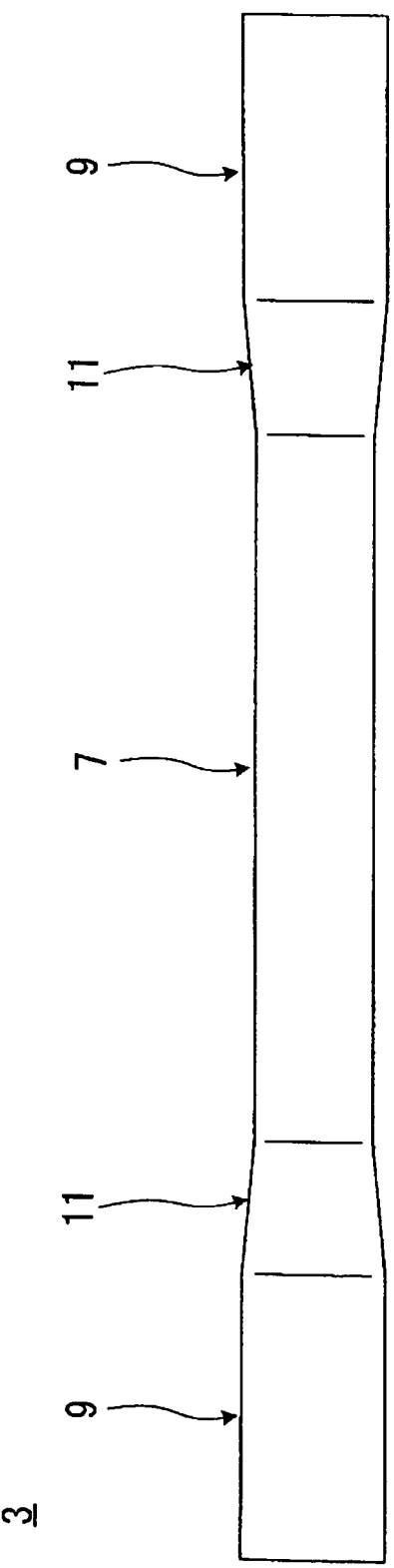
FIG. 11 is a view showing a main hose body.

When the mandrels 53 are inserted in the hose base body 31, the hose base body 31 is heated and vulcanized while being retained by the retaining mold 33. Then, the retaining mold 33 and the mandrels 53 are removed, and the main hose body 3 can be obtained as shown in FIG. 11. On the swaged portion 9 of thus manufactured main hose body 3, the joint devices 5 are mounted to obtain the high-pressure resistant hose 1 as shown in FIG. 1. A length change rate (elongation rate) under exerted pressure of the high-pressure resistant hose 1 is set in a range of −5% to 10%.

Then examples according to the present invention will be described.

As shown in Table 1, with respect to the high-pressure resistant hose 1, examples of high-pressure resistant hoses No. 1 to No. 6 and comparison examples of high-pressure resistant hoses No. 1 to No. 4 are produced, respectively, and each is measured and evaluated with respect to length change rate under exerted pressure (%), bursting pressure at room temperature (RT) (MPa), and durability under repeated pressures at high temperature. In the examples of the high-pressure resistant hoses No. 1 to No. 5 and the comparison examples of the high-pressure resistant hoses No. 1 to No. 4, respectively, the joint devices 5 of the same configuration are employed. In the example No. 6 of the high-pressure resistant hose, a joint device with the same construction, but of a slightly larger diameter is used.

The length change rate under exerted pressure is a value measured when a pressure is exerted at 3.5 MPa for 1 minutes with regard to the high-pressure resistant hose including a main portion with an inner diameter of 9.0 mm, and a value measured when a pressure is exerted at 1.1 MPa for 1 minutes with regard to the high-pressure resistant hose including a main portion with an inner diameter of 12.0 mm. The busting pressure at RT is a pressure at which the high-pressure resistant hose bursts when water pressure is exerted in the high-pressure resistant hose at room temperature while being increased by 160 MPa/minutes. The durability under repeated pressures at high temperature is indicated by durability when the high-pressure resistant hose is bent at 90° into L-shape on a longitudinal center thereof, securely fixed at longitudinal opposite end portions, one longitudinal end portion is closed and an oil pressure is applied repeatedly in the other longitudinal end portion. Here, an oil pressure of 100° C., 3.5 MPa is supplied repeatedly at pressurizing speed of 35 cpm.

In the line "No. of yarns" of the reinforcing layer of each of the examples and comparison examples in Table 1, "2 parallel yarns×24 carriers" means that two parallel reinforcing yarns are braided on a 24 carrier machine.

In Table 1, in the line "Length" (axial length, refer to L3) of "Tapered portion", figures "20", "12" and "10" indicate that the examples and the comparison examples have tapered portions with length of 10 mm, 6 mm and 5 mm on opposite end portions thereof, respectively. This also applies to the line "Length" of "Swaged portion", and the examples and the comparison examples have swaged portions with length of 6 mm, 5 mm and 4 mm on opposite end portions thereof, respectively. And, "Length" of "Swaged portion" means a length of the swaged portion in a free region of a main hose body (refer to L4).

With regard to "Bursting pressure at RT", a target value is 20 MPa or more for the high-pressure resistant hose including the main portion with the inner diameter of 9 mm, and the target value is 10 MPa or more for the high-pressure resistant hose including the main portion with the inner diameter of 12 mm.

TABLE 1

|  |  |  | Examples | | | | | |
|---|---|---|---|---|---|---|---|---|
|  |  |  | 1 | 2 | 3 | 4 | 5 | 6 |
| Dimension under pressureless condition | | | | | | | | |
| Main portion | Dimension | Inner diameter (mm) | 9.0 | 9.0 | 9.0 | 9.0 | 9.0 | 12.0 |
|  |  | Outer diameter (mm) | 16.0 | 16.0 | 16.0 | 16.0 | 16.0 | 18.0 |
|  |  | Length (mm) | 60 | 100 | 100 | 250 | 278 | 200 |
|  | Inner surface layer | Material | Cl-IIR | Cl-IIR | Cl-IIR | Cl-IIR | Cl-IIR | Cl-IIR |
|  |  | Wall thickness (mm) | 2.0 | 2.0 | 2.0 | 2.0 | 2.0 | 1.6 |
|  | Reinforcing layer | Material | PET | PET | PET | PET | PET | PET |
|  |  | No. of denier | 3000de | 3000de | 3000de | 3000de | 3000de | 3000de |
|  |  | No. of yarns | 2 parallel yarns × 24 carriers | 2 parallel yarns × 24 carriers | 2 parallel yarns × 24 carriers | 2 parallel yarns × 24 carriers | 2 parallel yarns × 24 carriers | 2 parallel yarns × 24 carriers |
|  |  | Braid angle (°) | 49 | 49 | 52 | 49 | 49 | 52 |
|  | Outer surface layer | Material | EPDM | EPDM | EPDM | EPDM | EPDM | EPDM |
|  |  | Wall thickness (mm) | 1.0 | 1.0 | 1.0 | 1.0 | 1.0 | 1.0 |
| Tapered portion | Dimension | Length (mm) | 20 | 20 | 20 | 20 | 12 | 20 |
|  | Reinforcing layer | Braid angle (°) | 58 | 58 | 60 | 58 | 58 | 57 |
| Swaged portion | Dimension | Inner diameter (mm) | 12.0 | 12.0 | 12.0 | 12.0 | 12.0 | 15.0 |
|  |  | Outer diameter (mm) | 17.5 | 17.5 | 17.5 | 17.5 | 17.5 | 20.5 |
|  |  | Length (mm) | 12 | 12 | 12 | 12 | 10 | 12 |
|  | Reinforcing layer | Braid angle (°) | 66 | 66 | 67 | 68 | 68 | 61 |
| Length of main hose body (free length) under exerted pressure (mm) | | | 100 | 130 | 136 | 272 | 285 | 228 |
| Initial length of main hose body (free length) (mm) | | | 92 | 132 | 132 | 282 | 300 | 232 |
|  | | | Good | Good | Good | Good | Good | Good |
| Length of main portion/initial length of main hose body (%) | | | 65 | 76 | 76 | 89 | 93 | 86 |
| Length change ratio under exerted pressure (%) | | | 8.7 | −1.5 | 3.0 | −3.5 | −5.0 | −1.7 |
|  | | | Good | Good | Good | Good | Good | Good |
| Bursting pressure at RT (MPa) | | | 23.2 | 23.1 | 25.0 | 22.8 | 22.7 | 14.0 |
|  | | | Good | Good | Good | Good | Good | Good |
| Durability under repeated pressures at high temperature | | | 100,000 cycles No disruption | 100,000 cycles No disruption | 100,000 cycles No disruption | 100,000 cycles No disruption | 100,000 cycles No disruption | 100,000 cycles No disruption |

TABLE 1-continued

|  |  |  | Comparison examples | | | |
|---|---|---|---|---|---|---|
|  |  |  | 1 | 2 | 3 | 4 |
| Demension under pressureless condition | | | | | | |
| Main portion | Dimension | Inner diameter (mm) | 9.0 | 9.0 | 9.0 | 9.0 |
|  |  | Outer diameter (mm) | 16.0 | 16.0 | 16.0 | 16.0 |
|  |  | Length (mm) | 100 | 100 | 50 | 282 |
|  | Inner surface layer | Material | C1-IIR | C1-IIR | C1-IIR | C1-IIR |
|  |  | Wall thickness (mm) | 2.0 | 2.0 | 2.0 | 2.0 |
|  | Reinforcing layer | Material | PET | PET | PET | PET |
|  |  | No. of denier | 3000de | 3000de | 3000de | 3000de |
|  |  | No. of yarns | 2 parallel yarns × 24 carriers | 2 parallel yarns × 24 carriers | 2 parallel yarns × 24 carriers | 2 parallel yarns × 24 carriers |
|  |  | Braid angle (°) | 47 | 54 | 49 | 49 |
|  | Outer surface layer | Material | EPDM | EPDM | EPDM | EPDM |
|  |  | Wall thickness (mm) | 1.0 | 1.0 | 1.0 | 1.0 |
| Tapered portion | Dimension | Length (mm) | 20 | — | 20 | 10 |
|  | Reinforcing layer | Braid angle (°) | 58 | — | 58 | 60 |
| Swaged portion | Dimension | Inner diameter (mm) | 12.0 | 12.0 | 12.0 | 12.0 |
|  |  | Outer diameter (mm) | 17.5 | Unable to be diametrically expanded | 17.5 | 17.5 |
|  |  | Length (mm) | 12 |  | 12 | 8 |
|  | Reinforcing layer | Braid angle (°) | 66 | 69 or less | 68 | 67 |
| Length of main hose body (free length) under exerted pressure (mm) | | | 124 |  | 91 | 284 |
| Initial length of main hose body (free length) (mm) | | | 132 |  | 82 | 300 |
|  | | | Good |  | Good | Good |
| Length of main portion/initial length of main hose body (%) | | | 76 |  | 61 | 94 |
| Length change ratio under exerted pressure (%) | | | −6.1 |  | 10.4 | −5.3 |
|  | | | Inferior |  | Inferior | Inferior |
| Bursting pressure at RT (MPa) | | | 21.0 |  | 23.5 | 23.0 |
|  | | | Good |  | Good | Good |
| Durability under repeated pressures at high temperature | | | 100,000 cycles No disruption |  | 100,000 cycles No disruption | 100,000 cycles No disruption |

As understood from Table 1, in the comparison example 1 including the reinforcing layer of braid angle 47° on the main portion, the main portion contracts largely in a longitudinal direction under exerted pressure, and the length change ratio under exerted pressure of an entire free length or free length is −6.1%, a minus value, and a large absolute value. In the comparison example 3 where the ratio of the length (an axial length, refer to L2) of the main portion with respect to the entire free length or free length (initial length of the main hose body, refer to L1) under pressureless condition is as small as 61%, a portion except for the main portion too much affects the length change ratio of the entire free length under exerted pressure, and therefore the length change ratio under exerted pressure is large, 10.4%. In the comparison example 2 including the reinforcing layer of braid angle of 54° on the main portion, buckling is caused on the hose base body at the time of formation of the swaged portion, and the mandrel cannot be properly inserted in the hose base body. In the comparison example 4, where the ratio of the length of the main portion with respect to the entire free length or free length (initial length of the main hose body) under pressureless condition is large, about 94%, the main portion too much affects the length change ratio of the entire free length under exerted pressure, and therefore the length change ratio under exerted pressure is −5.3%, a minus value, and a large absolute value large minus value.

On the contrary, in each of the examples No. 1 to No. 6 including the reinforcing layers of the braid angles 49° to 52° on the main portions 7, 61° to 68° on the swaged portions 9, and 57° to 60° on the tapered portions 11, respectively, the ratio of the length L2 of the main portion 7 with respect to the entire free length or free length (initial length of the main hose body) L1 under pressureless condition is good, 65% to 93%, and the length change ratio of the entire free length under exerted pressure is also good, −5.0% to 8.7%. And there is no disruption in the examples No. 1 to No. 6 even after 100,000 cycles of repeated pressures at high temperature. And, the high-pressure resistant hose including the main portion 7 with the inner diameter of 9.0 mm has a high bursting pressure of 22.8 MPa at minimum, and the high-pressure resistant hose including the main portion 7 with the inner diameter of 12 mm has a sufficient bursting pressure of 14.0 MPa.

The high-pressure resistant hose according to the present invention is, for example, arranged in a narrow piping space such as an engine room, and is used for conveying a high-pressure fluid.

And, according to the method for producing the high-pressure resistant hose of the present invention, it is possible to easily produce the high-pressure resistant hose, for example, to be arranged in the narrow piping space such as an engine room, and to be used for conveying a high-pressure fluid.

What is claimed is:

1. A high-pressure resistant hose with bursting pressure equal to or greater than 5MPa, comprising:
   a main hose body of multi-layered construction including an inner surface side layer, a reinforcing layer comprising a braided or spirally wound reinforcing filament member on outer side of the inner surface side layer and an outer surface side layer as cover layer on an outer side of the reinforcing layer, the main hose body having a main portion, and a tightened portion with diameter larger than that of the main portion on a longitudinal end portion of the main hose body,
   a joint device fixedly secured to the tightened portion, the joint device having an insert pipe inserted in the tightened portion with diameter larger than that of the main portion, and a tightening fitting fitted on an outer periphery of the tightened portion for tightening the tightened portion to the insert pipe,
   wherein the main hose body further has a tapered portion between the tightened portion and the main portion,
   wherein the braided or spirally wound reinforcing filament member of the reinforcing layer has an angle of 48° to lower than 54° on the main portion, an angle of over 57° to 68° on the tightened portion and an angle of over about 55° to 61° on the tapered portion,
   wherein the angle of the braided or spirally wound reinforcing filament member on the tapered portion is lower than the angle of the braided or spirally wound reinforcing filament member on the tightened portion, and
   wherein a ratio of a length of the main portion with respect to a free length of the main hose body is 65% to 93% under pressureless condition.

2. A high-pressure resistant hose as set forth in claim 1, wherein the braided or spirally wound reinforcing filament member of the reinforcing layer has an angle of 60° to 68° on the tightened portion.

3. A high-pressure resistant hose as set forth in claim 1, wherein the braided or spirally wound reinforcing filament member of the reinforcing layer has an angle of over about 55° to 60° on the tapered portion.

* * * * *